United States Patent
Tanaka et al.

(10) Patent No.: US 7,573,503 B2
(45) Date of Patent: Aug. 11, 2009

(54) IMAGE COMMUNICATION APPARATUS AND METHOD

(75) Inventors: Hiroshi Tanaka, Asaka (JP); Mikio Watanabe, Asaka (JP); Sugio Makishima, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 748 days.

(21) Appl. No.: 10/670,427

(22) Filed: Sep. 25, 2003

(65) Prior Publication Data

US 2004/0080653 A1  Apr. 29, 2004

(30) Foreign Application Priority Data

Sep. 26, 2002  (JP) .............................. 2002-280265

(51) Int. Cl.
*H04N 5/232*  (2006.01)
(52) U.S. Cl. ................................. 348/211.3; 348/211.2
(58) Field of Classification Search .. 348/211.1–211.11
See application file for complete search history.

(56) References Cited

U.S. PATENT DOCUMENTS

| | | | | |
|---|---|---|---|---|
| 6,111,662 | A * | 8/2000 | Satoh et al. .................. | 358/442 |
| 6,188,431 | B1 * | 2/2001 | Oie .......................... | 348/211.5 |
| 6,349,324 | B1 * | 2/2002 | Tokoro ....................... | 709/200 |
| 7,136,094 | B2 * | 11/2006 | Ziemkowski ............. | 348/211.1 |
| 7,139,018 | B2 * | 11/2006 | Grosvenor et al. ....... | 348/211.3 |
| 2007/0252901 | A1 * | 11/2007 | Yokonuma et al. ....... | 348/231.1 |

FOREIGN PATENT DOCUMENTS

| | | |
|---|---|---|
| EP | 0 790 734 A2 | 8/1997 |
| EP | 1 286 529 A1 | 2/2003 |
| JP | 09-284696 | 10/1997 |
| JP | 11-164282 | 6/1999 |
| JP | 2001-36791 | 2/2001 |
| JP | 2001-036791 | 2/2001 |
| JP | 2001-359044 | 12/2001 |
| WO | WO 99/48276 | 9/1999 |

OTHER PUBLICATIONS

European Search Report dated Jan. 8, 2004.
Japanese Office Action dated Nov. 6, 2007, with English language translation.

* cited by examiner

*Primary Examiner*—Tuan V Ho
(74) *Attorney, Agent, or Firm*—McGinn IP Law Group, PLLC

(57) ABSTRACT

When a plurality of image communication apparatuses, especially digital cameras, communicate images, each of the users of the receiving digital cameras can pull desired images from an image transmitting camera. In an image communicating method in which an image can be communicated by wireless in a server-client system, an image is displayed on a server camera, and an image is selected from among displayed images for transmission to a client camera. Pressing of the release button of the client camera instructs the client camera to transmit to the server camera a request to send an image to the server camera. The client camera transmits the request to send an image to the server camera. The server camera transmits the selected image to the client camera. Thus, the user of the client camera can obtain a desired image from the server camera.

18 Claims, 12 Drawing Sheets

RECORDING STRUCTURE OF
TAKEN IMAGE DATA IN MEMORY CARD

USER INTERFACE DISPLAY IN
WIRELESS MODE OF CAMERA

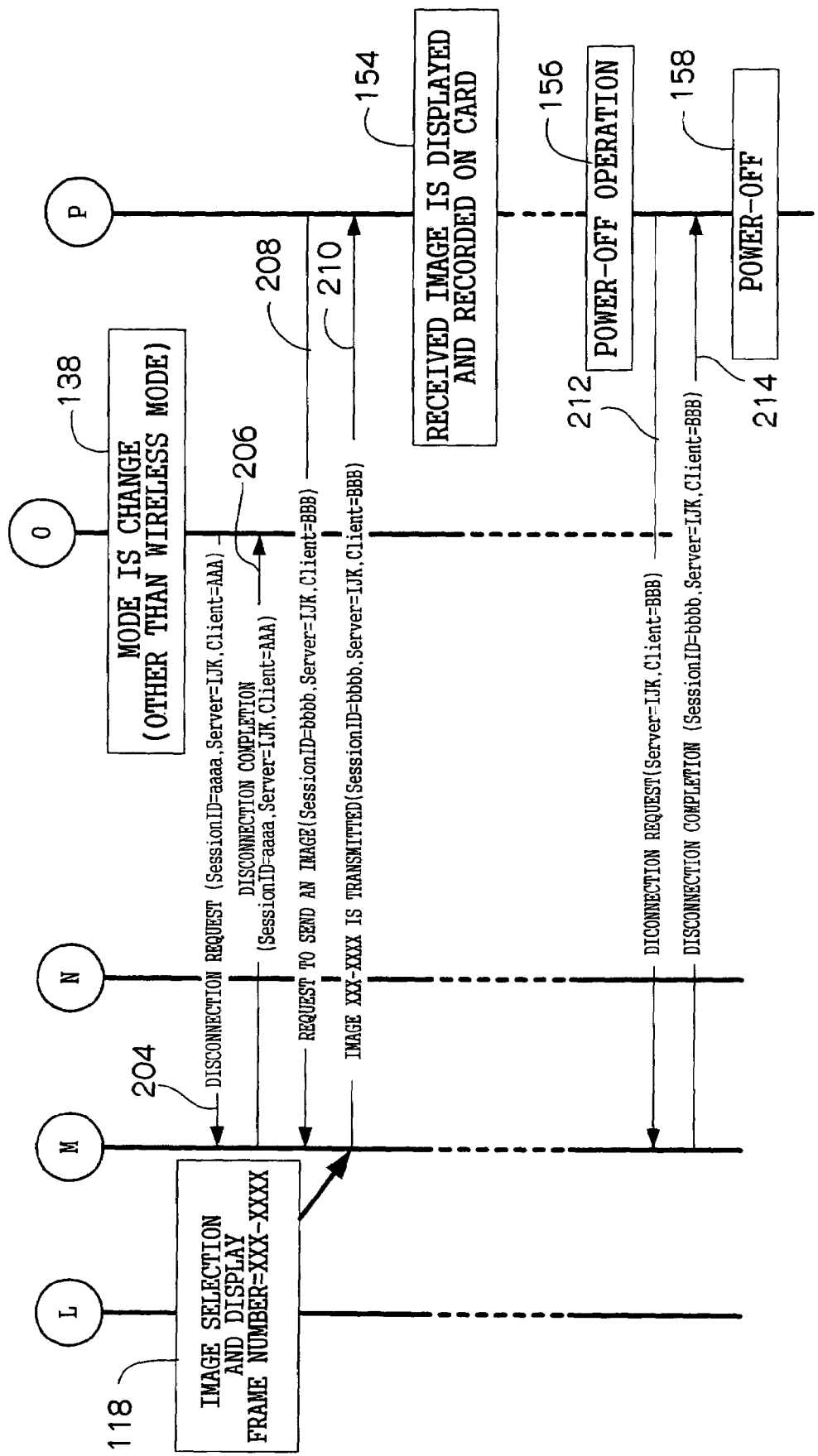

IMAGE COMMUNICATION APPARATUS AND METHOD

BACKGROUND OF THE INVENTION

1. Field of the Invention

The present invention relates to an image communication apparatus and method capable of performing wireless communications in a client-server system or in a master-slave system.

2. Description of the Related Art

Recently, a digital camera has become widespread, and it has been suggested that a wireless interface and an antenna should be mounted in the digital camera to perform wireless communications with another digital camera and external communications equipment. Especially, there are many requests to transmit an image taken by a digital camera to another digital camera or external communications equipment. For example, in a trip of a group of users each having his or her own digital camera, there arise requests to store an image taken by one user in a digital camera of another user who appears in the image.

Japanese Patent Application Publication No. 9-284696 discloses a PUSH type camera and its method in which a master side (client side) camera for use in controlling communications displays or selects an image to be transmitted, and then transmits the image to the receiving camera of a slave side (server side). This method is comprehensible and practical with a user interface operated when one transmitter corresponds to one receiver. However, if a plurality of images are to be transmitted to receiver cameras, and different images are to be transmitted to the respective receiver cameras, then the following problems occur. That is, a transmitter camera user selects images to be transmitted, inquire whether or not each receiver camera user requests the images, sets each camera of the user who requests the images as a destination, and then performs an image transmitting operation. In the above-mentioned trip of a group of users, the above-mentioned operation performed between the transmitter and each receiver is too complicated. When different images are transmitted to a plurality of users, the destinations are set for each image, and the management of the destination addresses is also complicated.

SUMMARY OF THE INVENTION

The present invention has been developed to solve the above-mentioned problems, and aims at providing an image communication apparatus and its method capable of allowing a user of an image receiver digital camera to pull each requested image from an image transmitter digital camera when a plurality of image communication apparatuses, especially digital cameras, communicate images.

The present invention according to first aspect is an image communication apparatus capable of communicating with another image communication apparatus in a server-client system, and includes: an image display device which displays a recorded image; a selection device which selects an image to be transmitted to another image communication apparatus from among the images displayed on the image display device; and a transmission device which transmits to another image communication apparatus the image selected by the selection device when a request to send the image is received from one or more image communication apparatuses at a client side of another image communication apparatus.

According to the first aspect of the present invention, the image communication apparatus can communicate with another image communication apparatus in a server-client system, functions as an image communication apparatus at a server side, displays an image on the image display device, selects in the selection device an image to be transmitted to another image communication apparatus from among the displayed images, and transmits through the transmission device the image selected by the selection device to another image communication apparatus when a request to send an image is received from one or more image communication apparatuses at a client side of another image communication apparatus.

Thus, the user of the image transmitting image communication apparatus receives a transmission request from the user of the client side image communication apparatus, and transmits the selected image to the client side image communication apparatus.

The present invention according to second aspect is an image communication apparatus capable of communicating with another image communication apparatus in a server-client system, and includes: a request transmission device capable of transmitting a request to send an image to an image communication apparatus at a server side when an image to be transmitted is selected from among images displayed on the image communication apparatus at the server side; and an instruction device which instructs the request to send the image to be transmitted to the image communication apparatus at the server side.

According to the second aspect of the present invention, the image communication apparatus capable of communicating with another image communication apparatus in a server-client system functions as an image communication apparatus at a client side, instructs by the instruction device a request to send an image to be transmitted to the server side image communication apparatus when an image to be transmitted is selected from among the images displayed on the server side image communication apparatus, transmits by the request transmission device to the server side image communication apparatus the request to send an image, and then the server side image communication apparatus transmits the image to the client side image communication apparatus. Then, the client side image communication apparatus receives the image.

Thus, the user of the image receiving image communication apparatus can obtain a desired image from the server side image communication apparatus.

The present invention according to third aspect is an image communicating method capable of communicating an image in a server-client system, and includes: a step of displaying an image at a server side; a step of selecting at the server side an image to be transmitted to a client side from among the displayed images; a step of instructing at the client side a request to send the image to the server side; a step of transmitting from the client side to the server side the request to send the image from the server side to the client side; and a step of transmitting from the server side to the client side the selected image when the server side receives from the client side the request to send the image.

According to the third aspect of the present invention, a request to send the image is transmitted to the server side at the instruction of the client side after the image is displayed and selected at the server side, and the image is transmitted from the server side to the client side. As a result, the image is received at the client side.

Thus, the user at the client side can obtain a desired image from the server side.

According to the present invention, a client side user can obtain a desired image from a server side in a PULL system. Therefore, it is not necessary to specify and confirm the address of a destination at the server side each time an image is transmitted from the server side. When there are a plurality of clients, the effect of the present invention is the more significant.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 12 is a flowchart continued from FIG. 11 showing the communications among the client camera A, client camera B, server camera C, and server camera D.

DETAILED DESCRIPTION OF THE PREFERRED EMBODIMENTS

The embodiments of the present invention are described below by referring to the attached drawings.

Figure 1:
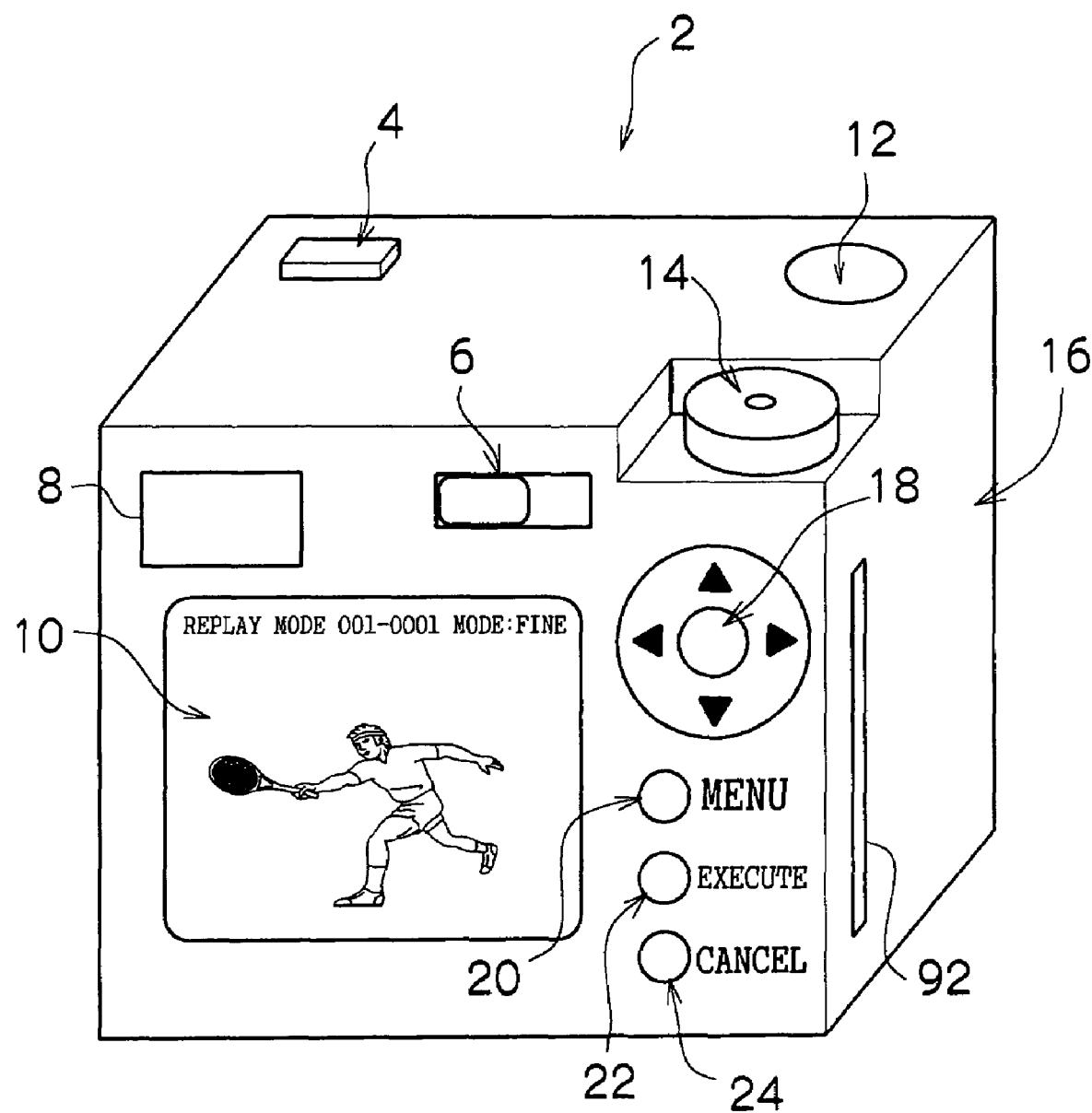
FIG. 1 is a perspective back view of the digital camera which is an image communication apparatus.

FIG. 1 is a perspective back view of a digital camera 2 which is an image communication apparatus according to an embodiment of the present invention.

The digital camera 2 can record and replay a still image and a moving picture, and can also perform wireless communications on them. On the front of the digital camera 2, a taking lens comprising a collapsible zoom lens, an optical finder, and an electric flash unit (not shown). Behind the taking lens, a charge-coupled device (CCD) image sensor 36 (see FIG. 3, hereinafter referred to as a "CCD") is mounted as an image pickup device.

Figure 2:
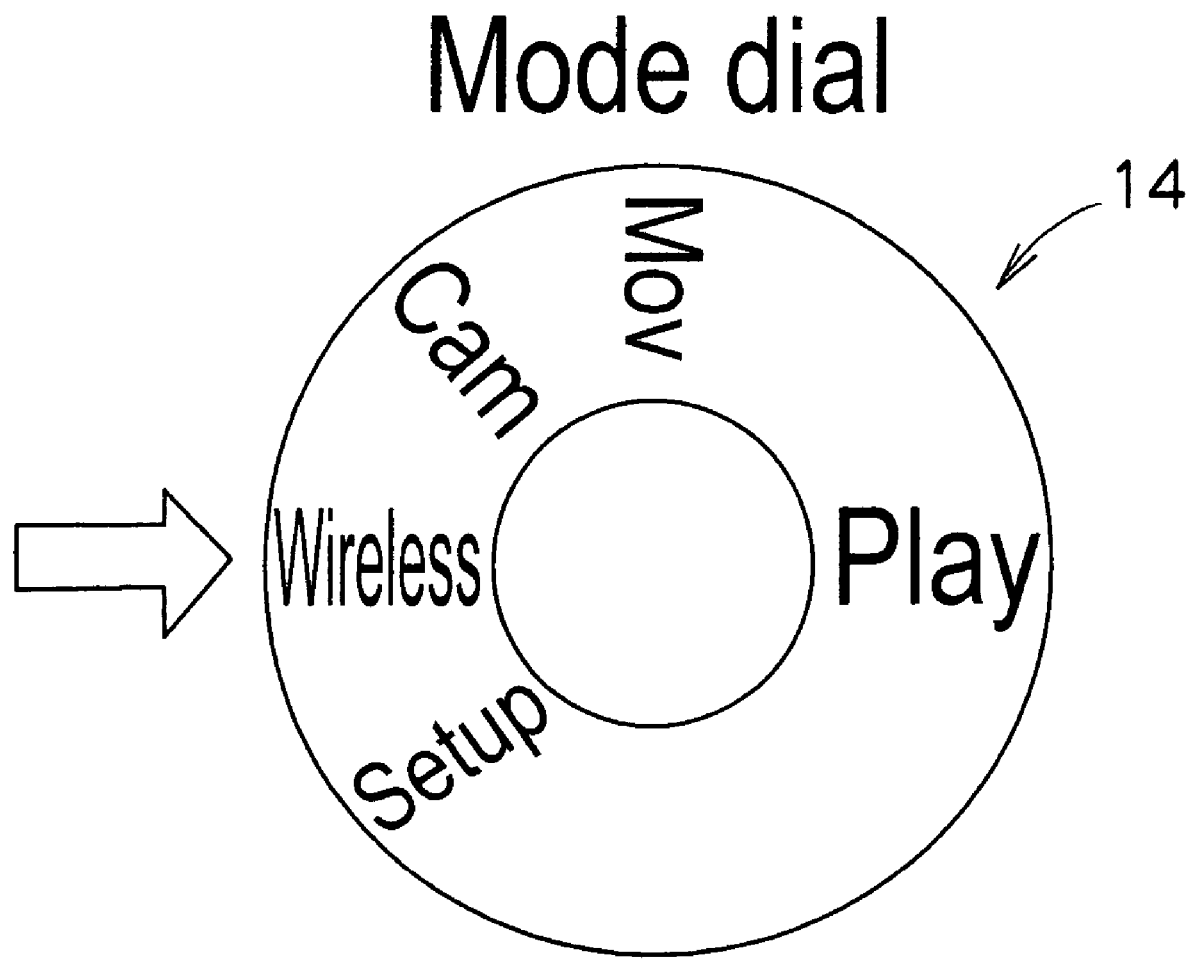
FIG. 2 is an enlarged view of a mode setting dial.

On the top of the digital camera 2, an antenna 4 for wireless communications, a release button 12, and a mode setting dial 14 are mounted. The release button 12 is an instruction device for indicating the acquisition of a focusing position and the start of recording an image, and issuing a request to a server side digital camera to send an image when the digital camera 2 functions at a client side. The release button 12 is an operation unit as a switch S1 set in the ON position when it is half-pressed (preparation for capture such as focusing, etc.), and as a switch S2 set in the ON position when it is full-pressed (released: indicating a request to send an image). As shown in FIG. 2, the mode setting dial 14 can be selectively set in the positions of a still image taking mode (Cam), a moving picture taking (movie) mode (Mov), a setup mode (Setup), a replay mode (Play), and a wireless communications mode (Wireless). With the configuration of the mode setting dial 14, the still image taking mode, the moving picture taking mode, and the wireless communications mode are independent modes. That is, any one mode of these three modes is selected.

A memory card slot 92 is made in one side of the camera 2. The memory card slot 92 is an inlet in slit form for insertion of a memory card 94 (storage medium) into the camera 2.

On the back of the camera 2, an optical finder 8, a power switch 6, a monitor display unit 10, an up-down-left-right key 18, a menu button 20, an execute button 22, and a cancel button 24 are provided. The power switch 6 is a power ON/OFF device. The up-down-left-right key 18 is used in selecting one of the up, down, left and right options by a press of the button when a menu is selected. When the taking mode is selected, a press of the menu button 20 displays various menus such as a portrait menu, a landscape menu, a nightscape menu, a monochrome menu, etc. The execute button 22 is use to select and execute a displayed menu. The cancel button 24 is used to cancel selection.

The monitor display unit 10 is a color liquid crystal display (LCD), displays an image captured through the CCD 36 and a replayed image read from the memory card 94, and also displays various information such as mode information, battery alarm, a capturing date and time, a standard number of pictures to be taken, a replayed frame number, image transmission, image reception, etc. The menu display, menu selection, and setting various setting items on each menu, etc. can be performed on the display screen of the monitor display unit 10.

Figure 3:
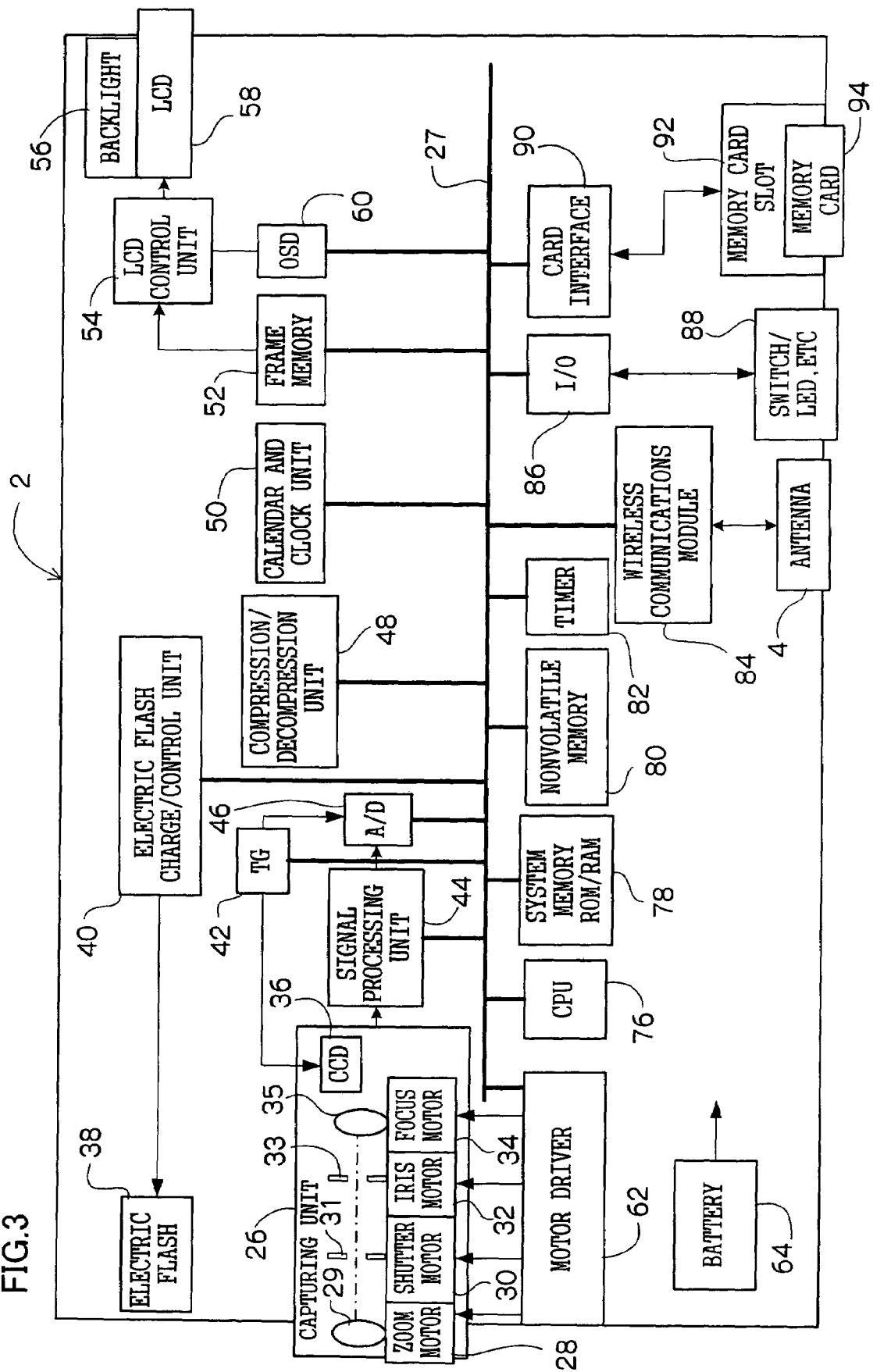
FIG. 3 is a block diagram of the configuration of a digital camera.

FIG. 3 is a block diagram of the configuration of the digital camera 2 according to an embodiment of the present invention. In FIG. 3, a signal processing unit 44, a timing generator 42, an A/D converter 46, an electric flash charge/control unit 40, a compression/decompression unit 48, a calendar and clock unit 50, frame memory 52, an on-screen display 60, a motor driver 62, a CPU 76, system memory 78, nonvolatile memory 80, a timer 82, a wireless communications module 84, an I/O interface 86, and a card interface 90 are connected through a bus 27.

A capturing unit 26 is provided with a zoom lens 29, a shutter 31, an iris diaphragm 33, a focus lens 35, and the CCD 36. It is also provided with a zoom motor 28 for driving the zoom lens 29, shutter motor 30 for driving the shutter 31, an iris motor 32 for driving the iris diaphragm 33, and a focus motor 34 for driving the focus lens 35. The motor driver 62 for driving the motors 28, 30, 32, and 34 is controlled by a control signal of the CPU 76. The CCD 36 is arranged behind the optical units 29, 31, 33, and 35.

After a ray of light passes through the zoom lens 29 and the shutter 31, the quantity of light is adjusted by the iris diaphragm 33, and then it passes through the focus lens 35 and enters the CCD 36. Photosensors are arranged in a plane on the photoreceptive surface of the CCD 36. A subject image formed on the photoreceptive surface of the CCD 36 is converted into signal charge by each photosensor depending on the quantity of incident light. The signal charges thus accumulated are sequentially read as a voltage signal depending on each value of the signal charge by the pulse from the timing generator 42.

The CCD 36 controls the charge accumulation time (shutter speed) of each photosensor by a shutter gate pulse, that is has the function of an electronic shutter. The exposure is controlled by a combination of the electronic shutter of the iris diaphragm 33 and the CCD 36, and an image signal output from the CCD 36 is processed by the signal processing unit 44.

The signal processing unit 44 includes various circuits for performing color separation, gain switch, γ processing, etc. After signals are processed, the image signal is A/D-converted by the A/D converter 46. The signal processing and the A/D conversion are operated by a pulse provided by the timing generator 42. The level of the input image signal of the A/D-converted image signal is detected by the CPU 76, the brightness information about a subject is obtained, and the focusing state of the subject is detected.

Then, the CPU 76 processes the image signal by generating a brightness and color difference signal, amending the sharpness (amendment of contour), perform white balance correction, and performing gamma correction to convert the image signal into brightness signal (Y signal) and a color difference signal (Cr, Cb signal), and stores the resultant signals in the system memory 78.

The image data stored in the system memory 78 is read at a command of the CPU 76, stored in the frame memory 52, and converted into a signal (for example, a color composite video signal in the NTSC system) of a predetermined format for display by an LCD control unit 54. The LCD control unit 54 manages the character information from the on-screen display 60. Then, a display signal is output to an LCD 58, a backlight 56 is lighted, and displayed on the LCD 58.

When a moving picture image is captured, the data in the system memory 78 is periodically rewritten by an image signal output from the CCD 36, and a video signal generated by the image data is provided for the LCD 58, thereby displaying the image captured by the CCD 36 as a moving picture in real time, and as, although not in real time, a series of substantially continuous images on the LCD 58.

During capturing, a pressing operation on the release button 12 which is a part of the switch/LED, etc. 88 issues a record start instruction signal, and the instruction signal is received by the I/O interface 86, and the capture of image data for recording is started according to the instruction signal. By the capturing operation performed by a press of the release button 12, the image signal captured in the system memory 78 is compressed by the compression/decompression unit 48 at a command from the CPU 76. The compressed image 25 signal is recorded on the memory card 94 through the card interface 90. The memory card 94 is inserted into the memory card slot 92 and located in a predetermined position. In the replay mode, the image data read from the memory card 94 is decompressed by the compression/decompression unit 48, and output to the LCD 58.

The type of storage medium is not limited to a memory card, but can be a PC card, compact flash, a magnetic disk, an optical disk, a magneto-optic disk, a memory stick, etc . . . That is, various media for a read/write can be used in the electronic, magnetic, or optical system, or a combination of these systems. A signal processing device and an interface is applied depending on a used medium. The configuration can be designed such that a plurality of media can be implemented in the camera 2 regardless of the type of recording medium. Furthermore, a unit for storing image data is not limited to a removable medium separable from the body of the camera, but can be a built-in recording medium (internal memory) in the camera 2, that is, the system memory 78 in the present embodiment.

The camera 2 is provided with the wireless communications module 84 for communicating image and character data with another digital camera, personal computer, or external equipment by wireless, and the antenna 4 connected to the wireless communications module 84. When the image and character data is communicated with another digital camera or external equipment by wireless, the mode setting dial 14 is set in the Wireless position, and the image (and character) data to be transmitted is read from the system memory 78 or the memory card 94 and transmitted, and the image and character data to be received is received through the antenna 4. The wireless communications module 84 can communicate data from the CPU 76, can be set in the sleep state at a command from the CPU 76 through the bus 27. In the sleep state, the current value of the motors 28, 30, 32, and 34 can be small enough to be ignored.

The CPU 76 is a control unit for integrally controlling each circuit of the camera system. The system memory 78 comprises a storage device such as ROM and RAM. The ROM stores a program processed by the CPU 76 and various necessary data, etc. required for control, and the RAM is used as a work area when the CPU 76 performs various arithmetic operations, etc. The CPU 76 controls the operation of a corresponding circuit according to an input signal received from the switch/LED, etc. 88, and controls the display on the LCD 58, and performs the AF (autofocus) control, the AE (auto exposure) control, etc.

The CPU 76 performs various arithmetic operations such as obtaining an AF evaluation value, an AE value, controls the motor driver 62 based on the arithmetic operation result, moves the focusing position of the focus motor 34, controls the iris motor 32 to appropriately set the aperture, and controls the charge accumulation time of the CCD 36.

The switch/LED, etc. 88 is a block of units including instruction input devices such as the release button 12, the mode setting dial 14, the up-down-left-right key 18, etc., and includes a device which specifies the number of pixels when an image is recorded, a device which switches the ON/OFF setting of the electronic zoom function, a device which operates the magnification of the electronic zoom, etc.

The electric flash charge/control unit 40 is connected to the bus 27, and an electric flash 38 is connected to the electric flash charge/control unit 40. Thus, the electric flash charge/control unit 40 controls the operation of the electric flash 38 when the electric flash 38 is used.

The calendar and clock unit 50, the nonvolatile memory 80, and the timer 82 are connected to the bus 27. The calendar and clock unit 50 records the date and time, and the nonvolatile memory 80 stores equipment information about the camera 2, and the timer 82 is used when a capturing operation is performed at a preset time.

The battery 64 supplies power to each section.

Figure 4:
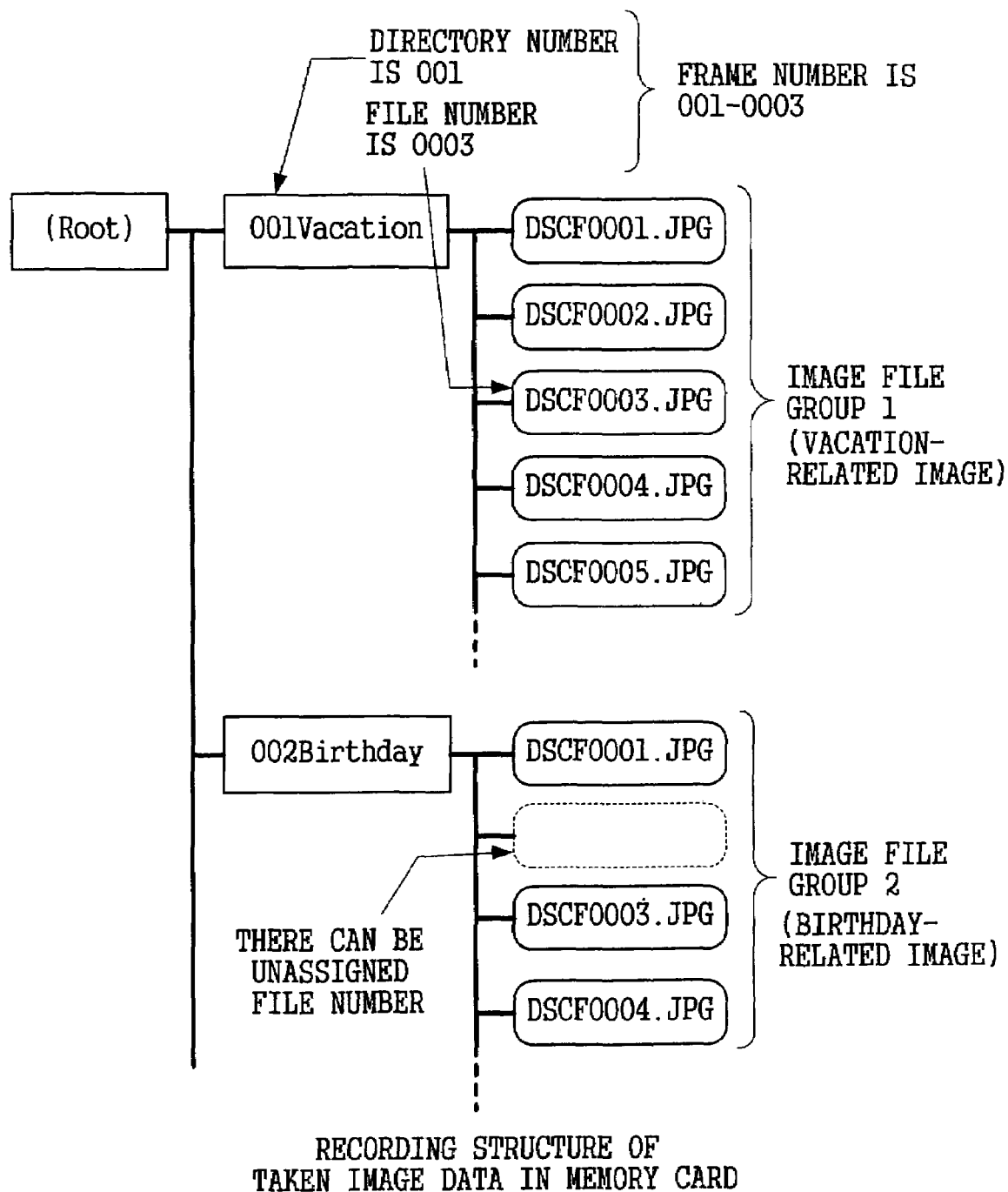
FIG. 4 shows the structure of recording a memory card.

The structure of the record of the image file of captured images on the memory card 94 is described below. FIG. 4 shows the structure of the record on the memory card. Some subdirectories are generated for the root directory. A subdirectory can be titled based on each captured content. In this example, the directory 001 is assigned "Vacation", and the directory 002 is assigned "Birthday". An image file group of vacation-related images are generated in the directory "Vacation", and each image file of the vacation-related image is assigned a file number. The frame number displayed on the monitor display unit 10 is, for example, "001-0003" when the image is the third image in the vacation-related images. On the other hand, an image file group of birthday-related images are generated in the directory "Birthday", and each image file of the birthday-related image is assigned a file number. There can be unassigned numbers in the file numbers.

The operation of the present embodiment is described below.

In this example, there are four digital cameras, two of which function as image transmitting cameras (server cameras), and other two of which function as image receiving cameras (client cameras). FIGS. 9 to 12 are flowcharts showing the communications between these client cameras A and B and server cameras C and D. The client camera A has an address "AAA", the client camera B has an address "BBB", the server camera C has an address "IJK", and the server camera D has an address "FGH".

In this example, in the communications between the client cameras and the server cameras, images to be transmitted from the server cameras are displayed, and each of the users of the client side cameras has an image transmitted by transmitting a request to obtain the image to the server camera using the release button 12 when the desired image is displayed on the server camera.

Figure 5:
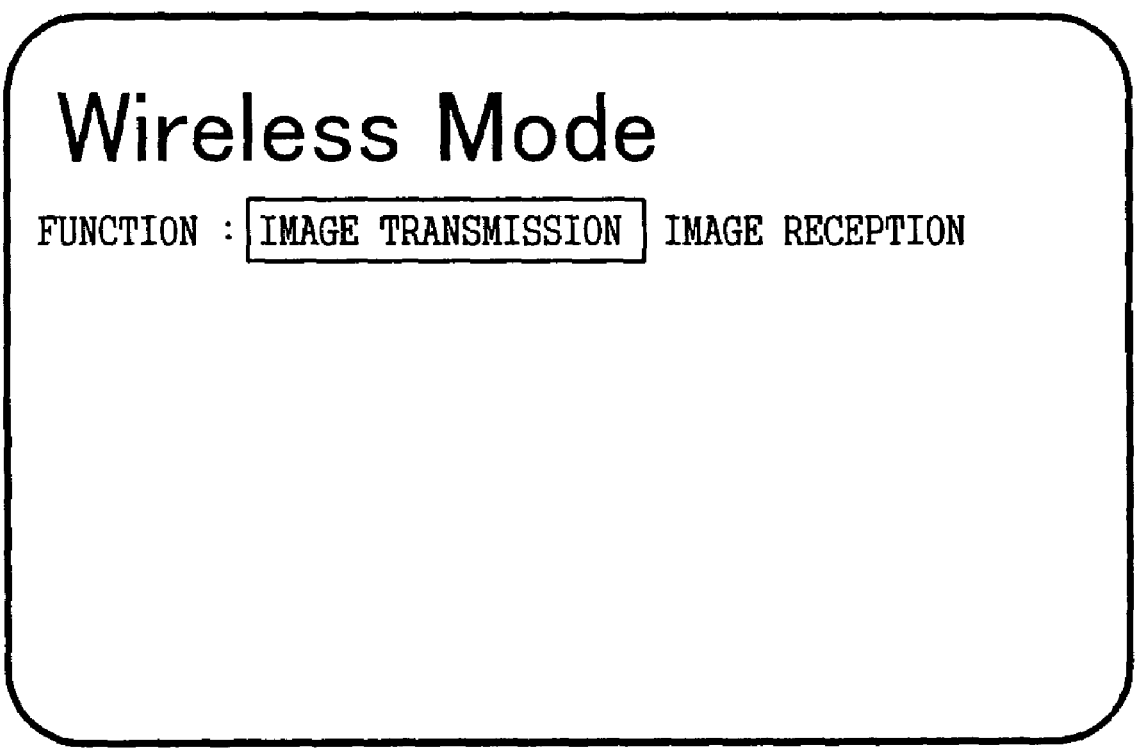
FIG. 5 shows the displayed data on the monitor display unit of the server camera when the mode setting dial is set in the wireless mode.
Figure 6:
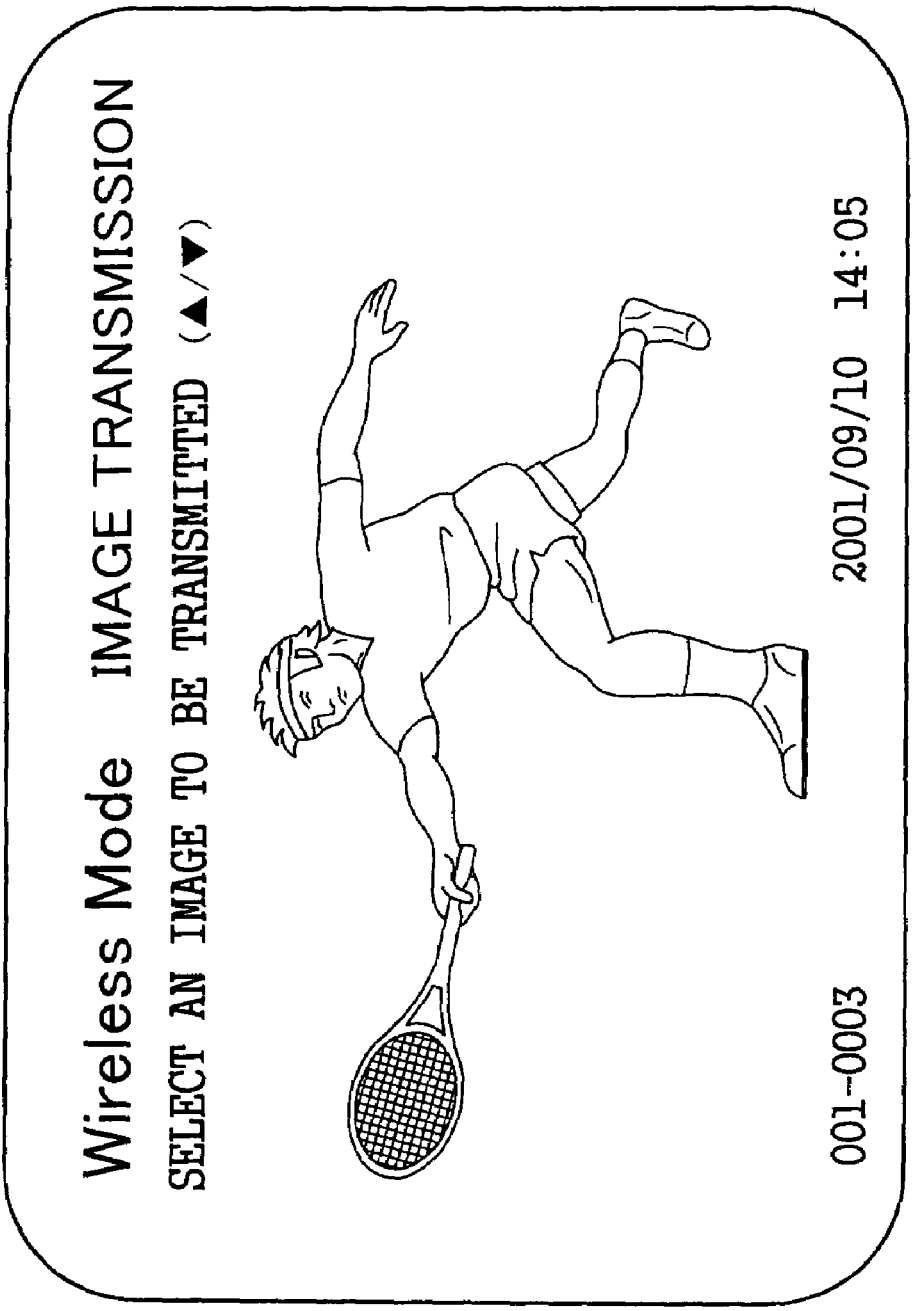
FIG. 6 shows the monitor display unit when the image is displayed after the image transmission function is selected on the display shown in FIG. 5.

First, on the server cameras C and D, the mode setting dial 14 is set in the Wireless mode (steps 100 and 104). The monitor display unit 10 of the server cameras C and D displays the screen as shown in FIG. 5. On the display, the "image transmission" function is selected (steps 102 and 106). Then, the server camera enters the image transmission mode as shown in FIG. 6, and the image being displayed is an image to be transmitted. Therefore, the image to be transmitted is selected by displaying an image on the screen. The image to be displayed is displayed by selecting an image file stored on the memory card 94 as shown in FIG. 4. On the screen of the monitor display unit 10 shown in FIG. 6, the frame number is incremented or decremented by the arrow ▲ and ▼ that the displayed image can go forward or backward. It is convenient if a capturing date recorded with a frame number and an image file are recorded with the displayed image on the screen of the monitor display unit 10. After selecting the image transmission function, the server cameras C and D are set such that the image selection task, the image transmission task, and the search response task can be operated.

Figure 7:
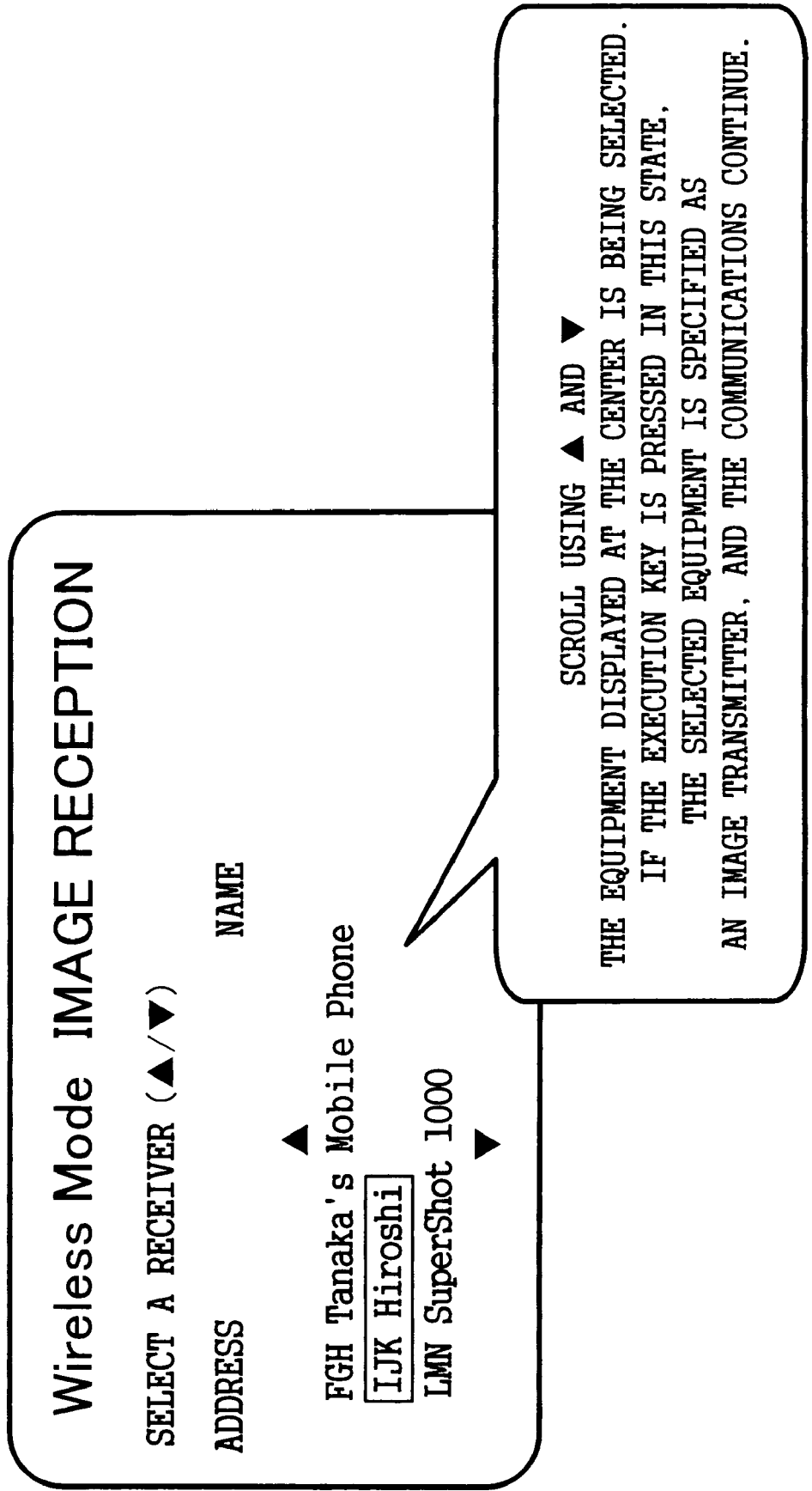
FIG. 7 is a list, displayed on the monitor display unit, of the server camera detected as a search result after selecting the image reception function on the display shown in FIG. 5.

When the image transmitting client camera A is set the mode setting dial 14 in the Wireless mode, the monitor display unit 10 of the client camera A displays the screen as shown in FIG. 5 (step 120). On this screen, the "image reception" function is selected (step 122). Then, the client camera enters the image reception mode as shown in FIG. 7. When the camera enters the image reception mode, the client camera A searches around it the server camera put in the image transmission mode (steps 160 and 162). If there are the server cameras C and D are detected around the client camera A, the search response task of the server cameras C and D works and transmits a server camera response signal to the client camera A (steps 164 and 166). When the signal is transmitted, it includes the addresses of the server cameras C and D, and the equipment names assigned to the server cameras C and D. The equipment name "Hiroshi" is assigned to the server camera D. The equipment name "Tanaka's mobile phone" is assigned to the server camera C. The equipment name can be assigned by a user to his or her camera using a personal computer, etc. although the detailed assigning method is not described here, and the model number, etc. can be recorded when the equipment is delivered from the factory.

On the client camera A, a list of server cameras detected as a result of the search is displayed as shown in FIG. 7 (step 124). The address and equipment name of the server camera contained in the server camera response signal are displayed in the list. The user of the client camera A selects a camera to be connected to from the list of the detected server cameras using ▲ or ▼ marks. In the example shown in FIG. 7, the central equipment, that is, the server camera C, is selected from among the three detected equipment units. If the execute button 22 is pressed in this state, the selected equipment (having the address "IJK") is actually selected as the image transmitting camera (step 124).

When a user determines a server camera to be connected to using the client camera A, a connection request is transmitted from the client camera A to the server camera C (step 168). The server camera C transmits a connection completion notification to the client camera A with the session ID added to it (step 170). The session ID is a unique ID for each connection, and assigned to individually manage each connection when a server camera is simultaneously connected from a plurality of client cameras.

Since the connection from a client camera to a server camera can be made at an optional timing independent of other connections, it is not necessary for a plurality of client cameras that are receiving images to simultaneously enter the client camera mode.

When the connection between the client camera A and the server camera C is completed, the user of the client camera A can perform an image obtaining operation (that is, an image transmission instructing operation) when a desired image is displayed on the server camera C. On the monitor display unit 10 of the server camera C, the image, the frame number (in this example, "xxx-xxxx"), and the capturing date are displayed (step 108). The case in which an image obtaining operation is performed at this time is described below. The image obtaining operation is performed by a press of the release button 12 on the client camera A, but it is not limited to this process.

When an image obtaining operation is performed using the client camera A (step 126), a request to send an image is transmitted from the client camera A to the server camera C (step 172). The server camera C transmits to the client camera A the image file of the image currently being displayed on the monitor display unit 10 (step 174). The image is transmitted to the client camera A to which a session ID has been transmitted, and a connection has already been made. Therefore, when there are a plurality of users of client camera who requests a certain image, the user of the server camera C only displays the image on the server camera. Then, the user of each client camera only performs the image obtaining operation (by a press of the release button) while the image is being displayed on the server camera.

Figure 8:
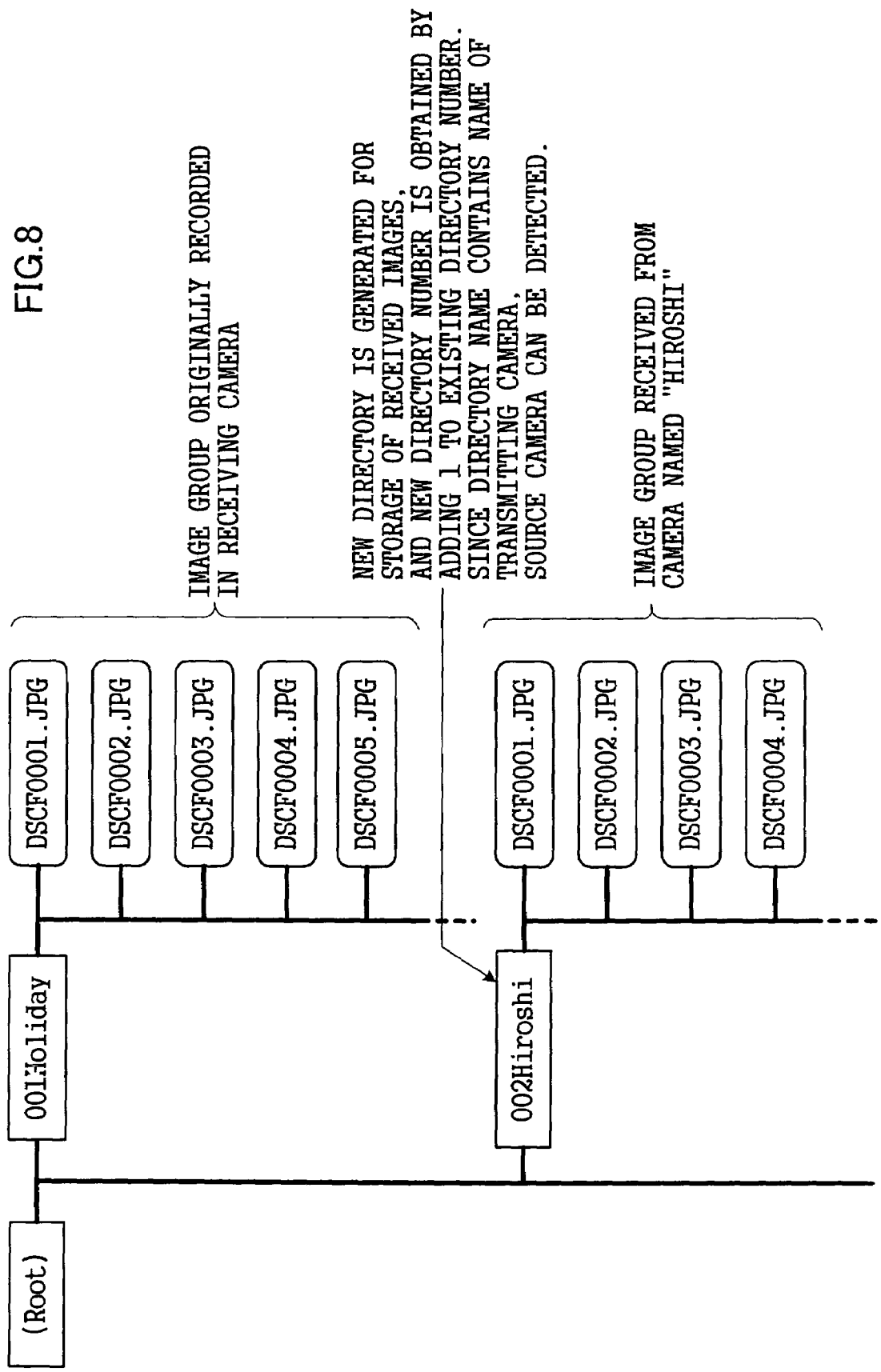
FIG. 8 shows the structure of the directory when a received image is stored on the memory card.
Figure 9:
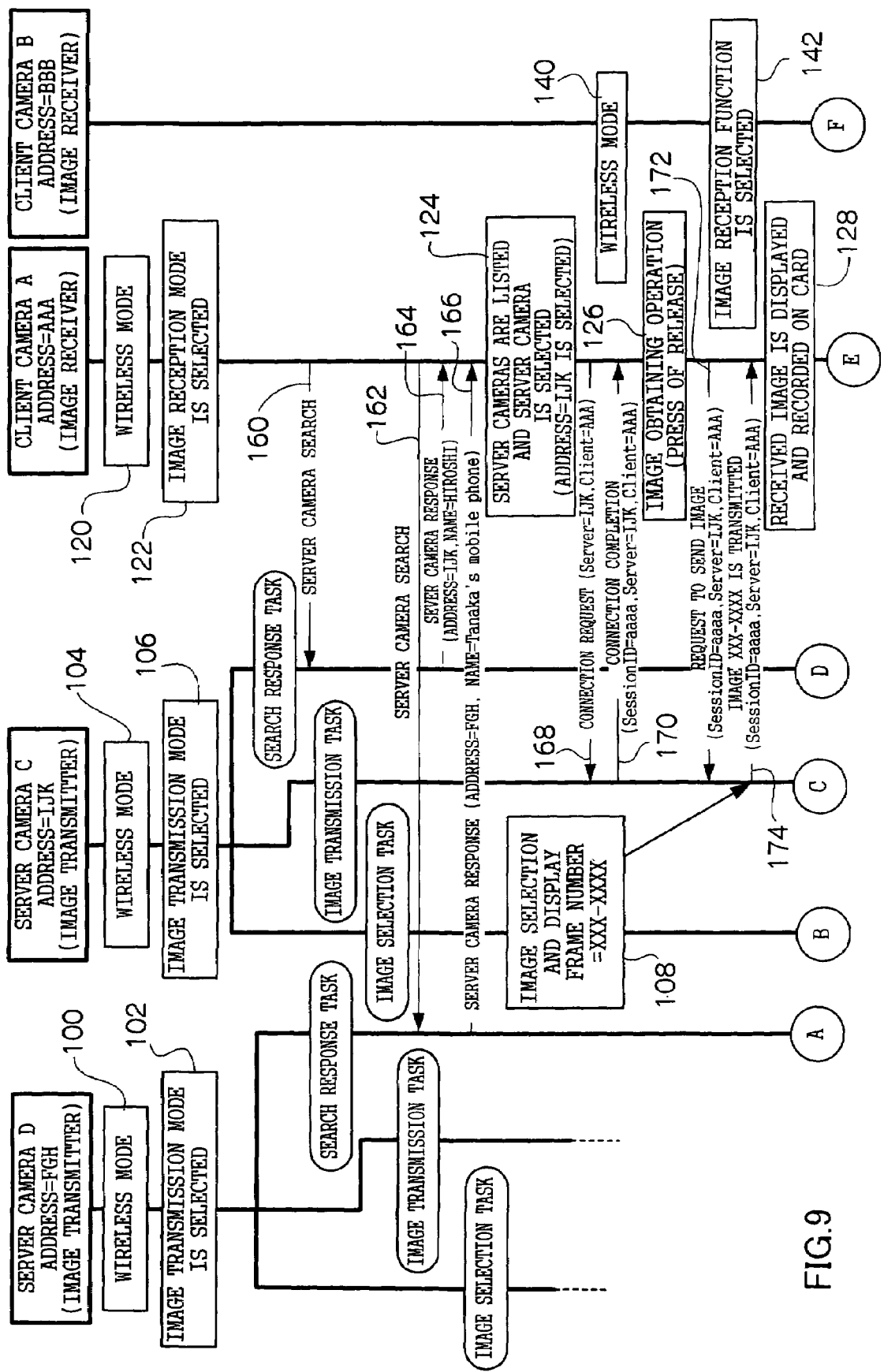
FIG. 9 is a flowchart of the communications among the client camera A, client camera B, server camera C, and server camera D.
Figure 10:
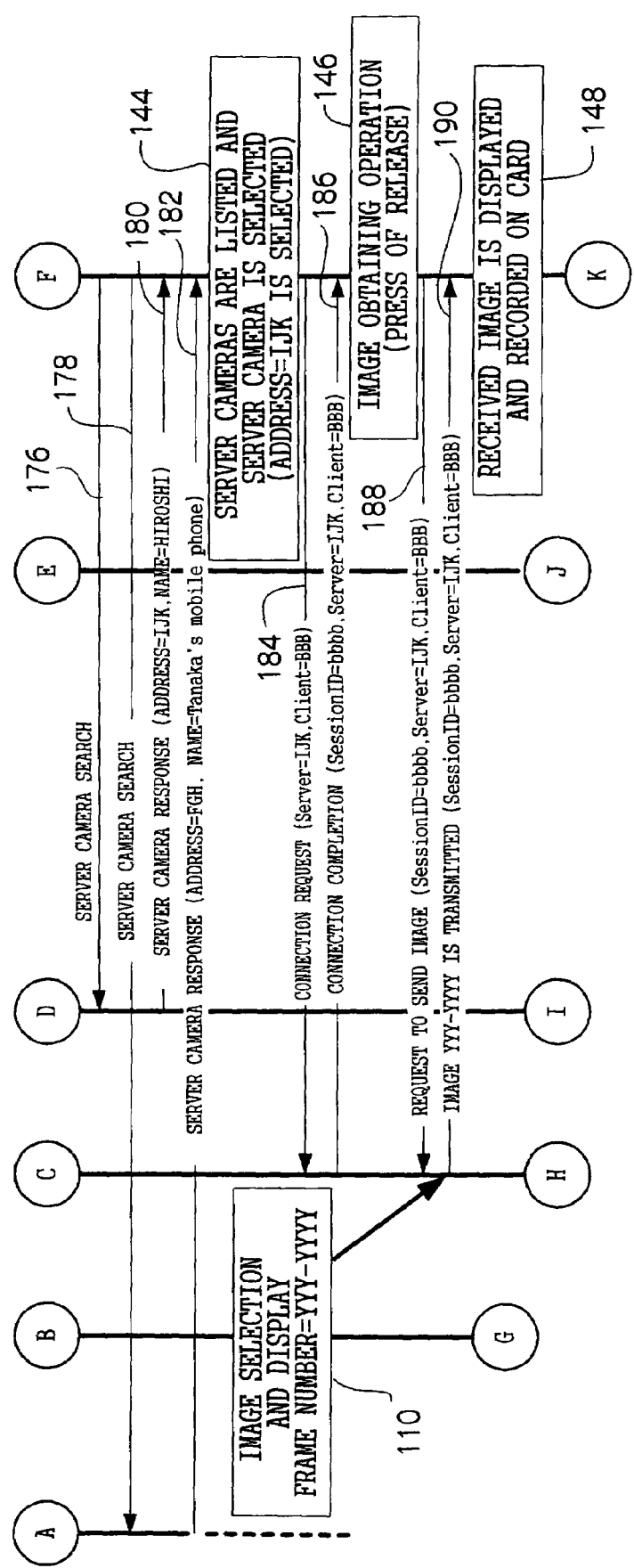
FIG. 10 is a flowchart continued from FIG. 9 showing the communications among the client camera A, client camera B, server camera C, and server camera D.

The image displayed on the client camera A is displayed on the monitor display unit 10 of the client camera A, and is simultaneously stored on the memory card 94 in the directory structure as shown in FIG. 8 (step 128). That is, the client camera A generates a directory having a new directory number to discriminate the image captured by the client camera A from the received image, and stores the received image in the generated directory. The new directory number is obtained by adding 1 to the currently largest directory number. In addition to the new directory number, the directory name of the new directory includes the name of the server camera which is the source of the image. As a result, the directory shows from which camera its image group has been transmitted. When a name is long, a predetermined leading number of characters are stored. Therefore, a client camera can generate a directory for each source server camera, and stores a received image therein, thereby easily managing the images by the user.

According to the present embodiment, as shown in FIGS. 9 to 12, the client cameras A and B transmit a request to send an image to the server camera C. When the client camera A performs an image obtaining operation (step 126), the client camera B starts preparing for a connection to the server camera C. When the client camera B puts the mode setting dial 14 in the Wireless mode, the monitor display unit 10 of the client camera B displays the screen shown in FIG. 5 (step 140), and selects the "image reception" function (step 142).

Then, the client camera B establishes a connection to the server camera C (steps 176, 178, 180, 182, 144, 184, and 186). The detailed steps of making a connection are similar to the steps of the connection between the server camera C and the client camera A. Therefore, the detailed explanation is omitted here.

When the connection between the client camera B and the server camera C is completed, the user of the client camera B can perform an image obtaining operation (that is, an image transmission instructing operation) when a desired image is displayed on the server camera C. On the monitor display unit 10 of the server camera C, the image, the frame number (in this example, "yyy-yyyy"), and the capturing date are displayed (step 110). The case in which an image obtaining operation is performed at this time is described below. The image obtaining operation is performed by a press of the release button 12 on the client camera B as described above by referring to the client camera A.

When an image obtaining operation is performed using the client camera B (step 146), a request to send an image is transmitted from the client camera B to the server camera C (step 188). The server camera C transmits to the client camera B the image file of the image currently being displayed on the monitor display unit 10 (step 190). The image is transmitted the client camera B to which a session ID ("bbbb" in this example) has been transmitted, and a connection has already been made.

The image received on the client camera B is displayed on the monitor display unit 10 of the client camera B, and is simultaneously stored on the memory card 94 in the directory structure as shown in FIG. 8 (step 148).

As described above, in the flowcharts shown in FIGS. 9 and 10, a connection is made to the server camera C first from the client camera A, and the image being displayed and having the frame number "xxx-xxxx" on the monitor display unit 10 is transmitted to the client camera A. At this time, the server camera C is not connected from the client camera B.

Then, the user of the client camera B appearing later connects the client camera B to the server camera C and obtains an image having the frame number "yyy-yyyy" displayed subsequent to the frame number "xxx-xxxx" by the operation of the user of the server camera C. At this time, the user of the client camera A does not perform the image obtaining operation for the image having the frame number "yyy-yyyy" which the user of the client camera A does not request.

Figure 11:
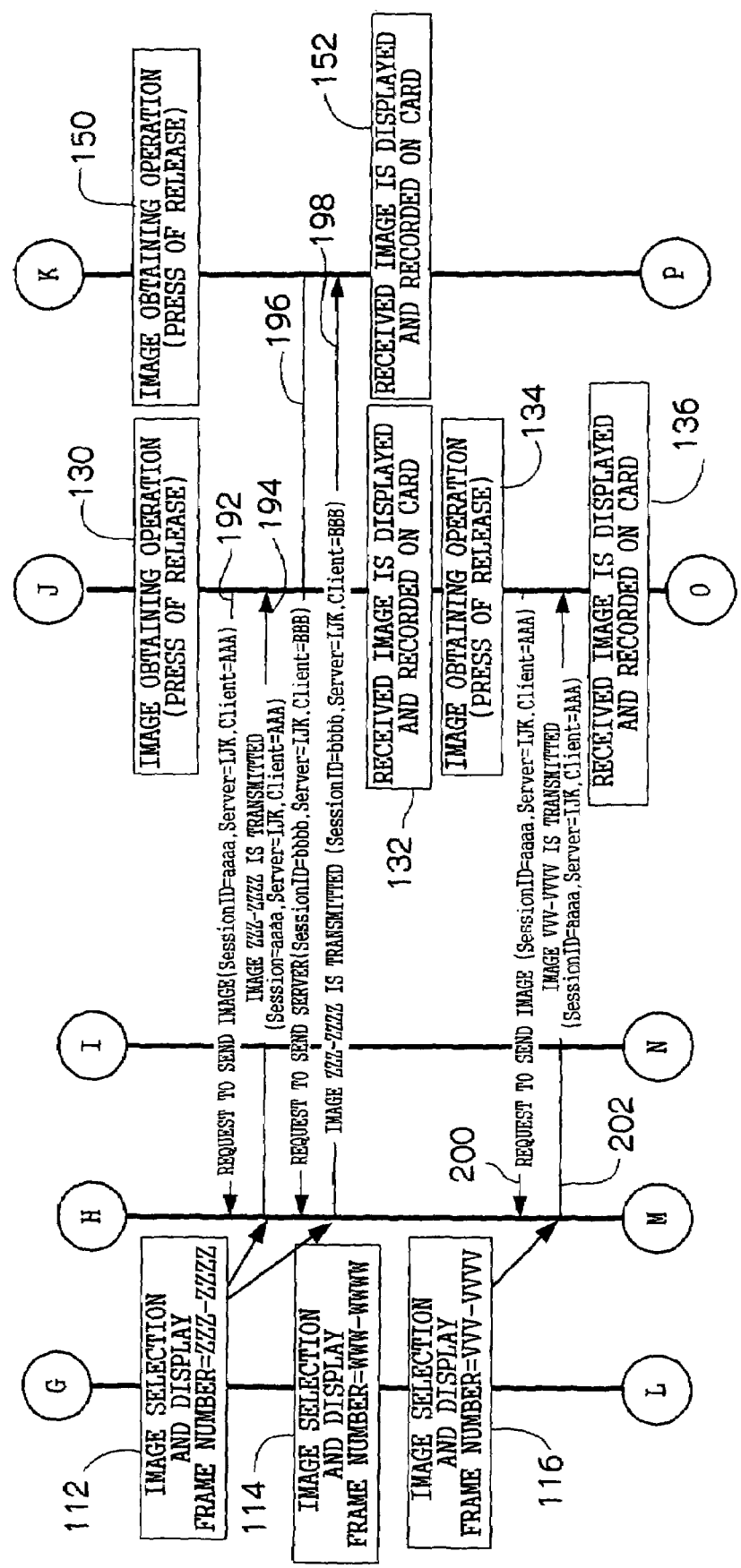
FIG. 11 is a flowchart continued from FIG. 10 showing the communications among the client camera A, client camera B, server camera C, and server camera D.

Then, as shown in FIG. 11, the user of the server camera C displays the image having the frame number "zzz-zzzz" (step 112). Since the displayed image is requested by the users of the client cameras A and B, a request to obtain an image is transmitted from the client cameras A and B (steps 130, 150, 192, and 196), and the server camera C transmits the image to the client cameras A and B (steps 194 and 198). The detailed steps of the image transmission are similar to those between the server camera C and the client camera A or B, and the detailed explanation is omitted here.

The images received by the client cameras A and B are displayed on the monitor display units 10 of the client cameras A and B, and are stored on the memory card 94 in the directory structure similar to structure shown in FIG. 8 (steps 132 and 152).

In the present embodiment, an image is transmitted to the client cameras (A and B) twice in a broadcast manner, but the present invention can be transmitted only once using a communications interface having a broadcast function.

Then, the user of the server camera C displays the image having the frame number "www-wwww" on the monitor display unit 10 (step 114). However, since the users of the client cameras A and B do not request the image, no image obtaining operations are performed, and skipped.

Next, the user of the server camera C displays the image having the frame number "vvv-vvvv" on the monitor display unit 10 (step 116). Since only the user of the client camera A requests it, the user of the client camera B does not perform the image obtaining operation, and a request to obtain an image is transmitted only from the client camera A to the server camera C (steps 134 and 200). The server camera C transmits the image to the client camera A (step 202). The detailed steps of the image transmission are similar to those between the server camera C and the client camera A or B, and the detailed explanation is omitted here.

The image received by the client camera A is displayed on the monitor display unit 10 of the client camera A, and is stored on the memory card 94 in the directory structure similar to that shown in FIG. 8 (step 136).

As shown in FIG. 12, since the user of the client camera A has to capture a new image using the camera, the user operates the mode setting dial 14 of the camera and puts it in the "Cam" mode (step 138). At this time, a request to disconnect the connection of the session ID is transmitted from the client camera A to the server camera C (step 204), and the server camera C transmits a disconnection completion notification to the client camera A (step 206). Since the connection between the server camera C and the client camera B is independent of other connections, the acquisition of an image from the server camera C to the client camera B can still be performed.

Then, the user of the server camera C remembers the image (having the frame number "xxx-xxxx") transmitted to the client camera A when the user of the client camera B is absent, and displays the image of the frame number on the monitor display unit 10 again (step 118) to show it to the user of the client camera B. Since the user of the client camera B requests the image of the frame number, the user transmits a request to send an image to the server camera C (step 208), and the server camera C transmits the image to the client camera B (step 210). The image received by the client camera B is displayed on the monitor display unit 10 of the client camera B, and is stored by the memory card 94 in the directory structure similar to that shown in FIG. 8 (step 154).

Then, the user of the client camera B performs a power-off operation (step 156), transmits a disconnection request to the server camera C (step 212), and a disconnection completion notification is transmitted from the server camera C to the client camera B (step 214). Then, the client camera B is powered off (step 158).

As described above, according to the present embodiment, when users of receiving cameras request different images to one image transmitting camera, the user of each receiving camera can receive a desired image using his or her own camera in a very simple operation. The number of receiving cameras can be one.

In FIGS. 9 to 12, although the server camera D entered the image transmission mode, the camera had no opportunity to transmit images to the client cameras A and B.

While images are being selected using the server camera C (that is, until an image is displayed with the mark ▲ or ▼ shown in FIG. 6 pressed), an image to be transmitted is not determined, and the server camera C can return "error" to the request to send an image from a client camera, or an image replayed immediately before can be transmitted. When the server camera returns "error", the client camera displays the error message.

It is obvious that a transmitted image can be either a still image or a moving picture. According to the present embodiment, cameras directly communicate with each other by wireless, but the communications system is not limited to this application. That is, a plurality of cameras can use an access point by wireless, or can be connected to each other by cable.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image communication apparatus capable of communicating with a plurality of image communication apparatuses in a server-client system, comprising:
   an image display device which displays a recorded image;
   a selection device which selects an image to be transmitted to another image communication apparatus from among images displayed on the image display device; and
   a transmission device capable of transmitting to one or more of the plurality of image communication apparatuses the image selected by the selection device when a request to send the image is received from a respective one of said one or more of the plurality of image communication apparatuses,
   wherein when the image selected is transmitted to the plurality of image communication apparatuses of a receiving side, an image different in every image communication apparatus of the receiving side is transmittable to the plurality of image communication apparatuses in accordance with the request of the image communication apparatus of the receiving side, and
   wherein the image communication apparatus communicates with said plurality of image communication apparatuses through a server.

2. The image communication apparatus according to claim 1, wherein the image communication apparatus comprises a digital camera.

3. An image communication apparatus capable of communicating with another image communication apparatus in a server-client system, comprising:
   a mode selecting device including an image transmission mode and an image reception mode;
   a request transmission device capable of transmitting a request to send an image to an image communication apparatus at a server side when an image to be transmitted is selected from among images displayed on the image communication apparatus at the server side; and
   an instruction device which instructs the request to send the image to be transmitted to the image communication apparatus at the server side, wherein
   the image communication apparatus searches for a server device when the mode selecting device is in the image reception mode.

4. The image communication apparatus according to claim 3, wherein the image communication apparatus comprises a digital camera.

5. The image communication apparatus according to claim 4, wherein the instruction device comprises a device which operates using a release button of the digital camera.

6. An image communicating method capable of communicating an image in a server-client system, comprising:
   selecting at a client side from a plurality of servers a server side to send a request for an image;
   displaying an image at the server side;
   selecting at the server side an image to be transmitted to a client side from among displayed images;
   instructing at the client side a request to send the image to the server side;
   transmitting from the client side to the server side the request to send the image from the server side to the client side; and
   transmitting from the server side to the client side the selected image when the server side receives from the client side the request to send the image.

7. The image communication apparatus according to claim 1, wherein the plurality of image communication apparatuses comprise wireless communication devices.

8. The image communication apparatus according to claim 3, further comprising an image display device which displays a recorded image.

9. The image communication apparatus according to claim 8, wherein the image display device displays a list of server devices detected during the search.

10. The image communicating method according to claim 6, further comprising setting the server side to a wireless communication mode.

11. The image communicating method according to claim 6, further comprising searching from the client side for detectable servers.

12. The image communicating method according to claim 11, further comprising displaying a list of detected servers.

13. The image communicating method according to claim 12, further comprising displaying at least one of an address and an equipment name for the detected servers.

14. The image communicating method according to claim 6, further comprising transmitting a unique session identifier when a connection is made between the client side and the server side.

15. The image communicating method according to claim 6, further comprising receiving at a plurality of client side devices the image to be transmitted.

16. The image communicating method according to claim 15, further comprising displaying on the plurality of client side devices the received image.

17. The image communicating apparatus according to claim 1, wherein the image communication device is capable of receiving images and transmitting images.

18. An image communication apparatus capable of communicating with a plurality of image communication apparatuses in a server-client system, comprising:
   an image display device which displays a recorded image;
   a selection device which selects an image to be transmitted to another image communication apparatus from among images displayed on the image display device;
   a transmission device capable of transmitting to one or more of the plurality of image communication apparatuses the image selected by the selection device when a request to send the image is received from a respective one of said one or more of the plurality of image communication apparatuses,
   wherein when the plurality of images are transmitted to the plurality of image communication apparatuses of a receiving side, an image different in every image communication apparatus of the receiving side is transmittable to the plurality of image communication apparatuses in accordance with the request of the image communication apparatus of the receiving side,
wherein the image communication device is capable of receiving images and transmitting images, and
wherein the image communication apparatus searches for a server device when receiving an image.

* * * * *